(12) United States Patent
Dyrba et al.

(10) Patent No.: US 12,074,982 B2
(45) Date of Patent: Aug. 27, 2024

(54) AUTHENTICATION OF PROCESS EXECUTION IN VIRTUAL ENVIRONMENTS

(71) Applicant: SAP SE, Walldorf (DE)

(72) Inventors: Tobias Dyrba, Edingen-Neckarhausen (DE); Steffen Koenig, Heidelberg (DE); Tsonyo Lazkov Yonchev, Sofia (BG)

(73) Assignee: SAP SE, Walldorf (DE)

( * ) Notice: Subject to any disclaimer, the term of this patent is extended or adjusted under 35 U.S.C. 154(b) by 414 days.

(21) Appl. No.: 17/695,927

(22) Filed: Mar. 16, 2022

(65) Prior Publication Data

US 2023/0299968 A1    Sep. 21, 2023

(51) Int. Cl.
  *H04L 9/32* (2006.01)
  *G06F 9/455* (2018.01)
  *H04L 9/08* (2006.01)

(52) U.S. Cl.
  CPC ........ *H04L 9/3242* (2013.01); *G06F 9/45533* (2013.01); *H04L 9/088* (2013.01)

(58) Field of Classification Search
  CPC .... H04L 9/3242; H04L 9/088; G06F 9/45533
  USPC ....................................................... 713/189
  See application file for complete search history.

(56) References Cited

U.S. PATENT DOCUMENTS

| | | | |
|---|---|---|---|
| 10,637,952 B1 | 4/2020 | Koenig et al. | |
| 10,761,879 B2 | 9/2020 | Hoke et al. | |
| 10,768,900 B2 | 9/2020 | Krebs et al. | |
| 11,310,035 B2* | 4/2022 | Mistry | H04L 9/14 |
| 11,573,929 B2* | 2/2023 | Biondo Junior | H04L 9/0643 |
| 2015/0058619 A1* | 2/2015 | Sweet | G06F 21/56 713/155 |
| 2016/0013942 A1* | 1/2016 | Nocera | G06F 21/41 713/155 |
| 2016/0127307 A1* | 5/2016 | Jain | G06F 3/065 709/245 |
| 2018/0295115 A1* | 10/2018 | Kumar | H04L 63/0428 |
| 2019/0050376 A1 | 2/2019 | Krebs et al. | |
| 2020/0320046 A1* | 10/2020 | Narayanamurthy | G06F 16/215 |
| 2021/0157731 A1 | 5/2021 | Krebs et al. | |
| 2021/0303734 A1* | 9/2021 | Tsirkin | H04L 9/0897 |
| 2021/0409347 A1 | 12/2021 | Krebs et al. | |
| 2022/0206842 A1* | 6/2022 | Sahita | G06F 9/4856 |
| 2022/0414024 A1* | 12/2022 | Gong | G06F 21/78 |
| 2023/0281324 A1* | 9/2023 | Tsirkin | G06F 21/53 726/26 |

(Continued)

*Primary Examiner* — Dereena T Cattungal
(74) *Attorney, Agent, or Firm* — Fish & Richardson P.C.

(57) ABSTRACT

Methods, systems, and computer-readable storage media for authorizing execution of processes that access cached data of an application running in a virtualized cloud environment. A first composite encrypted value comprising a first encrypted secret and a first secure hash value of a first secret is retrieved at a first virtual machine. The first encrypted secret is decrypted using a cryptographic key to determine a second secret to be used for initiating a first process (pα) on the first virtual machine. A second secure hash value of the second secret is generated. The second secure hash value is compared with the first secure hash value to determine whether to authorize execution of the first process on the first virtual machine using the first secret. In response to determining that the second secure hash value and the first secure hash value match, the first process is initiated at the first virtual machine.

20 Claims, 6 Drawing Sheets

(56) References Cited

U.S. PATENT DOCUMENTS

2023/0315579 A1\* 10/2023 Arumugam ......... G06F 11/1458
713/189

\* cited by examiner

AUTHENTICATION OF PROCESS EXECUTION IN VIRTUAL ENVIRONMENTS

BACKGROUND

Software applications may execute processes to provide user-requested services. A cloud platform landscape includes different software applications and services that are distributed across multiple nodes, tenants, or physical machines. Customers consume services provided by a composition of a variety of cloud applications or services. The applications and services can be provided by different cloud providers and run at different segments or zones of a cloud environment. For example, applications running at different virtual machine environments can communicate to provide data in response to user requests. Oftentimes one application from one cloud provider utilizes services from another application provided by a different cloud provider. When applications communicate with each other to provide services, data is exchanged between the instances, where such data can be privacy protected data. In some cases, applications can store data invoked from another service in local cache.

SUMMARY

Implementations of the present disclosure are directed to authorizing execution of processes that access cached data of an application running in a virtualized cloud environment.

One example method may include operations such as: retrieving, at a first virtual machine, a first composite encrypted value comprising a first encrypted secret ($A_{\alpha\_enc}$) and a first secure hash value of a first secret ($A_\alpha$); decrypting the first encrypted secret ($A_{\alpha\_enc}$) using a cryptographic key ($k_\alpha$) to determine a second secret ($A_\alpha'$) to be used for initiating a first process ($p_\alpha$) on the first virtual machine, wherein the cryptographic key ($k_\alpha$) is determined based on a set of properties of the first virtual machine that are mutatable during cloning of the first virtual machine; generating a second secure hash value of the second secret ($A_\alpha'$); comparing the second secure hash value with the first secure hash value to determine whether to authorize execution of the first process on the first virtual machine using the first secret ($A_\alpha$); and in response to determining that the second secure hash value and the first secure hash value match, initiating the first process ($p_\alpha$) at the first virtual machine by providing the first secret ($A_\alpha$) for processing through the first process ($p_\alpha$).

Other implementations of this aspect include corresponding systems, apparatus, and computer programs, configured to perform the actions of the methods, encoded on computer storage devices.

In some instances, the example method can include retrieving, at the first virtual machine, the set of properties of the first virtual machine, wherein a property from the set of properties is a unique identifier for the first virtual machine from a plurality of virtual machines that provide virtual environment resources for running applications and services.

In some instances, the composite encrypted value can be retrieved from a cache storage of the first virtual machine or from a secret storage associated with the first virtual machine.

In some instances, the example method can include generation of the first encrypted secret ($A_{\alpha\_enc}$) that is to be stored at a security storage associated with the first virtual machine, wherein the first secret ($A_\alpha$) is generated based on source data from at least one of secure random number generator, human input, and an external service program.

In some instances, the first process ($p_\alpha$) can be implemented at an application running on the first virtual machine and managed by a hyperscaler, wherein the hyperscaler provides a runtime environment comprising virtual resources for hosting virtual machines.

In some instances, the retrieval of the first composite encrypted value can be performed upon start of the first virtual machine. A secure space for storing secure cache data can be identified by an operating system running at the first virtual machine. The first process ($p_\alpha$) can be authorized to access the secure space upon successful decryption of the first encrypted secret ($A_{\alpha\_enc}$) and verification of the first secure hash value when the first enc, secure hash value matched with the second secure hash value.

In some instances, the first composite encrypted value can be associated with a first service provider and is stored by a secret storage service of a second service provider, wherein the first service provider and the second service provider manage application deployed on a cloud platform, the cloud platform including the first virtual machine and other virtual machines.

In some instances, the first virtual machine can provide a first virtual environment including virtual resources for running the first process ($p_\alpha$). The first process ($p_\alpha$) when running consumes services provided by a second virtual environment. The first virtual environment and the second virtual environment can be at different trust zones of a cloud platform.

In some instances, the second virtual environment can host a storage service for storing the first composite encrypted value.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are directed to authentication of execution of processes that access cached data of an application running in a virtualized cloud environment. More particularly, implementations of the present disclosure are directed authentication of an origin of a request to execute a process provided by an application that caches data (including secret protected data) on a virtual machine (VM) where the application is running.

In some instances, a first application can be provided by a first cloud provider and a second application can be provided by a second cloud provider. The first application can consume resources of the second application when providing services to end users. In some instances, the two applications (or more) can be defined to form a composition of applications that interact to provide services to other entities or end users. For example, the applications of the composition can be micro services or other cloud applications that can cache data related to executed operations and/or processes.

In some instances, when a first application consumes resources from the second application, the second application can provide data to the first application as a response. For example, the first application can send requests to the second application (e.g., a secret storage service application) and consume secret (or confidential) data. In some instances, the second application can be a cloud application running on virtualized resource of a cloud platform where the first application is running (or on a separate isolated cloud platform or segment of the cloud environment). The second application can run at different data centers and/or trust zones of the cloud platform.

In some instances, the received data from the second application can be cached at the first application. In some instances, data caching can improve data processing of the first application, where the cached data can be reused for subsequent operations at the first application, can reduce the number of requests sent to the second application, can improve the timeliness of serving requests at the first application, and can support resilient service and high performance at the first application in cases when the second application has limited availability, among other examples.

In some cases, the throughput of the first application can be higher than the throughput of the second application, and the first application can store received data from the second application to improve timing for serving requests to end users that are associated with the cached data. In some cases, the cloud provider of the first application can be charged per request for querying data from the second application and/or the second application may have a limited number of processed requests per time-period to avoid excessive consumption that may threaten the availability of the second application.

In some instances, an operator or service of a third-party cloud provider that is not associated with a composition of application providing services to end users can have limited access to confidential information (or data) of the first application. In those instances, the third-party operator can be limited to accessing at least some of the cached data of the first application (e.g., secret data obtained from the second application and cached at the first application) or other data of the first application that can be identified as confidential and with privacy protection regime.

In some instances, the third-party operator may request to clone (or fork) virtual resources (e.g., VM) where the first application is running to elevate the operator into an owner of the cloned resources and gain access to the confidential data of the first application in the cloned instances. The cloning of a VM can include complete copying of an image running on the VM that replicates data included in the first VM at the time of the cloning. However, access to cached data that is confidential data may be required to be restricted in cases where the third-party operator is not authorized to have such access to at least some of the data (including the confidential data that is cached) of the first application at the first VM prior cloning.

In some instances, to prevent third-party operators from obtaining access to confidential (secret) data that should be protected from unauthorized access and use, process execution at applications running on virtual resources provided by a cloud environment can be configured to require authentication of origin of request to be executed. In some instances, the confidential data can be encrypted with a key that is unique to the virtual machine where the application is running and an encrypted secret can be generated. Such encrypted secrets can be maintained at a secret storage for use during authentication of execution of processing and accessing confidential data at virtual machines. The process execution can be associated with providing access to at least a portion of the confidential (secret) data at the virtual machine where the process is run. In some instances, the authentication can be performed by determining whether the requests can decrypt the confidential data required for the execution of a process.

Figure 1:
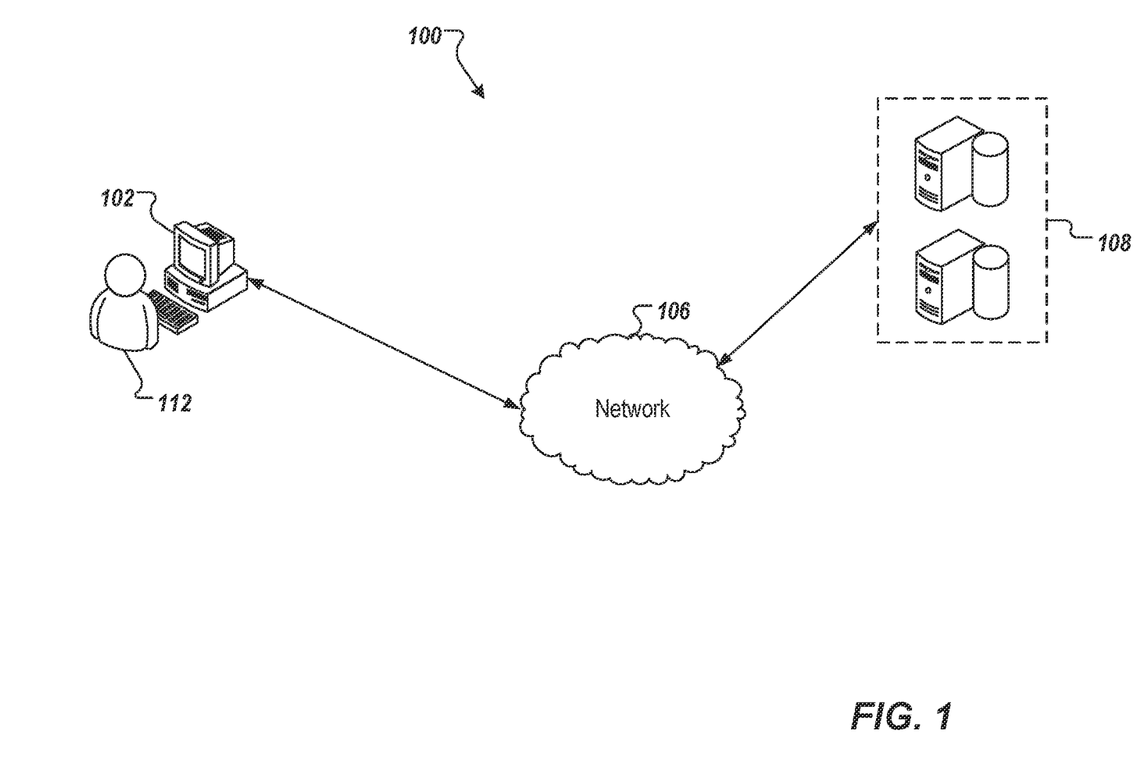
FIG. 1 depicts an example architecture that can be used to execute implementations of the present disclosure.

FIG. 1 depicts an example architecture 100 in accordance with implementations of the present disclosure. In the depicted example, the example architecture 100 includes a client device 102, a network 106, and a server system 108. The server system 108 includes one or more server devices and databases (e.g., processors, memory). In the depicted example, a user 112 interacts with the client device 102.

In some examples, the client device 102 can communicate with the server system 108 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 108 includes at least one server and at least one data store. In the example of FIG. 1, the server system 108 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the server system 108 can host an application (e.g., provided as one or more computer-executable programs executed by one or more computing devices) that provides services in relation to products to end users. The application can be a cloud application that communicates with one or more applications to provide services to end users. The application can cache application data including secure data obtained during execution of processes and invoked from other applications (e.g., storage services). The application can be configured to identify stored data that is privacy protected. In some instances, the storage of cache data can be divided into segments to differentiate between protected and not-protected data. In some instances, protected data can be provided for process execution based on an implemented authentication procedure including decryption of an encrypted secret to execute a process at the application in accordance with implementations of the present disclosure.

In some instances, an operating system running on the virtual machine where the application is executing may identify a secure space in the random access memory of the virtual machine for storing secure cache data. In some instances, a first process ($p_\alpha$) can be authorized to access the secure space upon successful decryption of the encrypted secret generated for the secret data based on a cryptographic key that can be associated with properties of the VM that can be used to determine the identity of the origin of the process execution.

Figure 2:
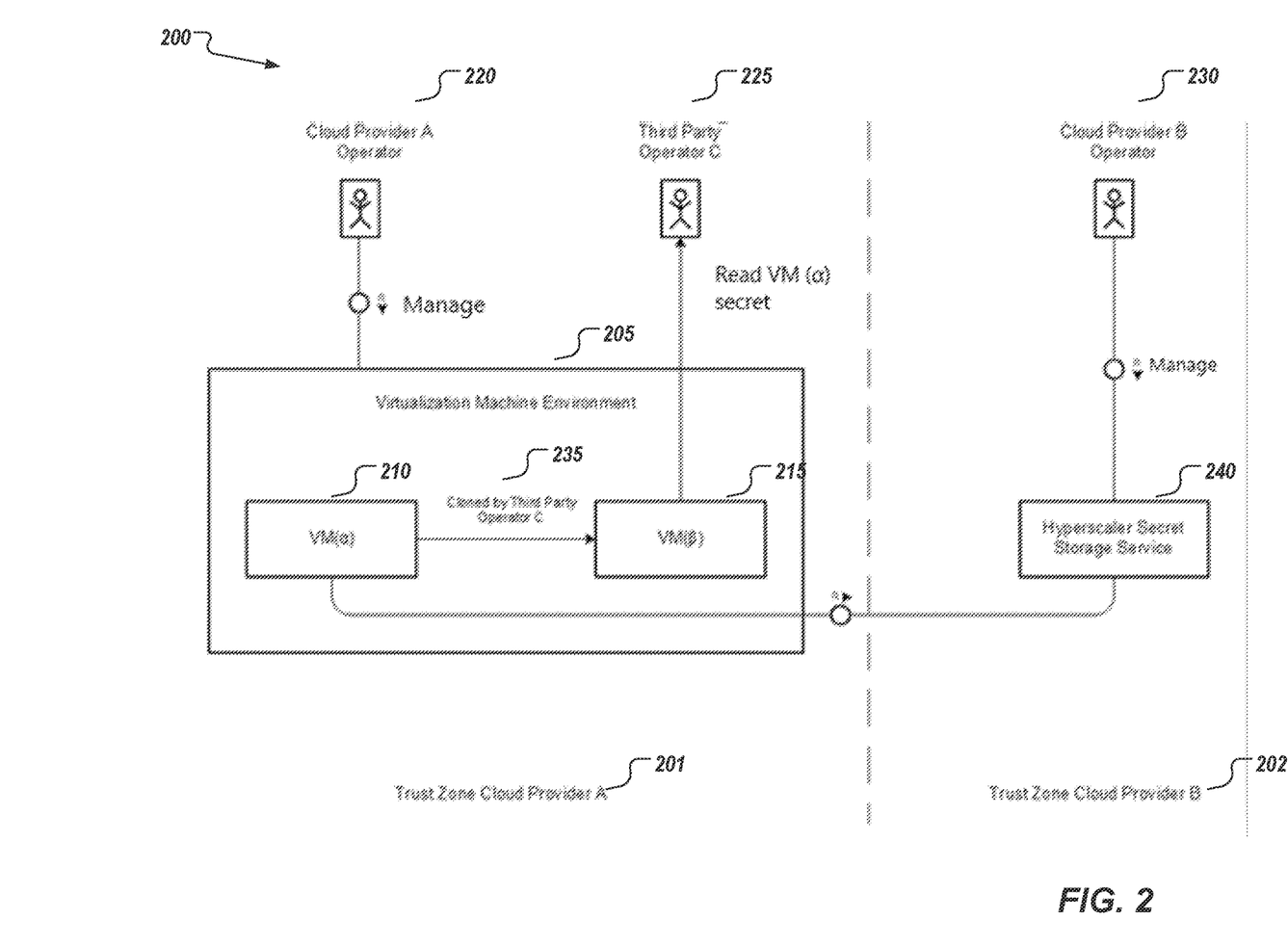
FIG. 2 depicts an example architecture that can be used to execute implementations related to authorizing execution of processes based on secret verification in accordance with implementations of the present disclosure.

FIG. 2 depicts an example architecture 200 that can be used to execute implementations related to authenticate execution of processes based on secret verification in accordance with implementations of the present disclosure. In some instances, the example architecture 200 includes a cloud platform environment that includes two (or more) trusted zones.

Cloud computing is associated with development and management of networks of hybrid applications spanning among various environments and trust zones (e.g., platform spaces or environments that are in control of different owners). Different applications can be provided by different software providers and can provide different resources and/or services. In some instances, the example architecture 200 can include software applications and systems that are hosted at a public cloud platform environment. In some of those instances, multiple applications and systems associated with a customer can be hosted at a common cloud area of the cloud environment and can be managed based on services provided by a landscape management tool. In some instances, cloud applications can run on a hyperscaler runtime environment (e.g., provided by a third-party), where the hyperscaler can manage the increase of virtual resources to be used based on demand from applications running on the cloud environment. In some instances, the hyperscaler can provide virtual resources for starting and running VMs that host cloud applications provided by different cloud provider.

In some instances, communication between entities (applications or services) running on virtualized environments at different trust zones of the cloud environment and that implement different functionality provided by different providers and sources may be associated with increased security concerns. Communication between different entities in a network of services and applications can be associated with risks of security breaches and a loss of control over confidential data. Access to cached data of cloud applications can be associated with high security restrictions.

For example, multiple entities of an application can be started to support higher demand from a given application to address high availability requirements for the application. However, cloning of a virtual environment where one instance of an application is running can be associated with restrictions to accessing cached data at the running instance.

In some instances, a first trust zone 201 can be provided by a cloud provider A 220 and can include virtualization machine environment 205 where different cloud providers can execute applications and services on corresponding VMs. In some instances, a cloud provider A 220 can manage a VM($\alpha$) 210. One or more applications can run on the VM($\alpha$) 210. In some instances, an application running on the VM($\alpha$) 210 can communicate with an application or service running at another trust zone of the cloud environment, e.g., trust zone 202. The trust zone 202 can be provided by a different cloud provider B 230. In some instances, the application running on VM($\alpha$) 210 can consume data (secret data) from a storage service 240 running at the trust zone 202 and cache such data, for example, for use in subsequent process executions.

In some instances, consumed data from the storage service 240 can be cached to the application at the VM($\alpha$) 210 and such data can be confidential data that can be provided for use based on authentication criteria. In some cases, a third-party, such as third-party operator C 225, can initiate to clone the VM($\alpha$) 210 and try to present himself as an owner of the VM($\alpha$) 210 and access cached data at the VM($\alpha$) 210. However, access to such cache data may be required to be privacy protected and not provided without authentication. In those cases, to limit access to cache data in applications, initiation of processes at a VM (e.g., at VM($\alpha$) 210 or at a cloned version of VM($\alpha$) 210) can be based on an authentication rule. In some instances, an initiation of a process may be based on authentication based on an encrypted secret. In some instances, the encrypted secret can be pre-defined for a VM and can be based on unique characteristics of the VM, for example, properties that can distinguish one VM from another VM in a cloud environment.

At 235, the third-party operator C 225 can initiates to clone VM($\alpha$) 210 into VM($\beta$) 215. For example, the third-party operator C 225 may be without access to confidential information stored in the storage service 240 and may initiate to clone the VM($\alpha$) 210 in an attempt to promote himself into an owner of the cloned resource and acquire access to the confidential information that is obtained at the VM($\alpha$) 210 from the storage service 240. When the VM($\alpha$) 210 is cloned and the VM($\beta$) 215 is started, a process associated with a running application on the cloned VM may be initiated that includes access to the confidential data cached on the VM. The process execution may be secured by requiring authentication based on decrypting an encrypted secret confidential data. The confidential data can be encrypted based on properties of the VM where the application is running, such as properties identifying VM(α) 210 that differentiate VM 210 from other VMs (e.g., VM(β) 215).

At the cloned VM(β) 215, properties of the VM(β) 215 can be read to generate a cryptographic key that can be used to decrypt the encrypted secret that can be acquired either from the cache of the VM(β) 215 or obtained from a key storage.

The initiated process at the VM(β) 215 can request to retrieve the encrypted secret that is to be decrypted to authenticate the execution of the process. The decryption can be based on the cryptographic key that is determined based on properties of the VM(β) 215. In cases where the encrypted key cannot be successfully decrypted, the process may not be authorized for execution and access to cached data at running applications on the VM(β) 215 can be restricted. Since the VM(β) 215 stores properties unique to the VM(β) 215 that differentiate the VM(β) 215 from other VMs including VM(α) 210, the VM(β) 215 as a clone of VM(α) 210 cannot generate a cryptographic key that can successfully decrypt the encrypted secret. Thus, the cloning 235 may fail due to unsuccessful authentication to obtain access to cached data of the closed VM.

Figure 3:
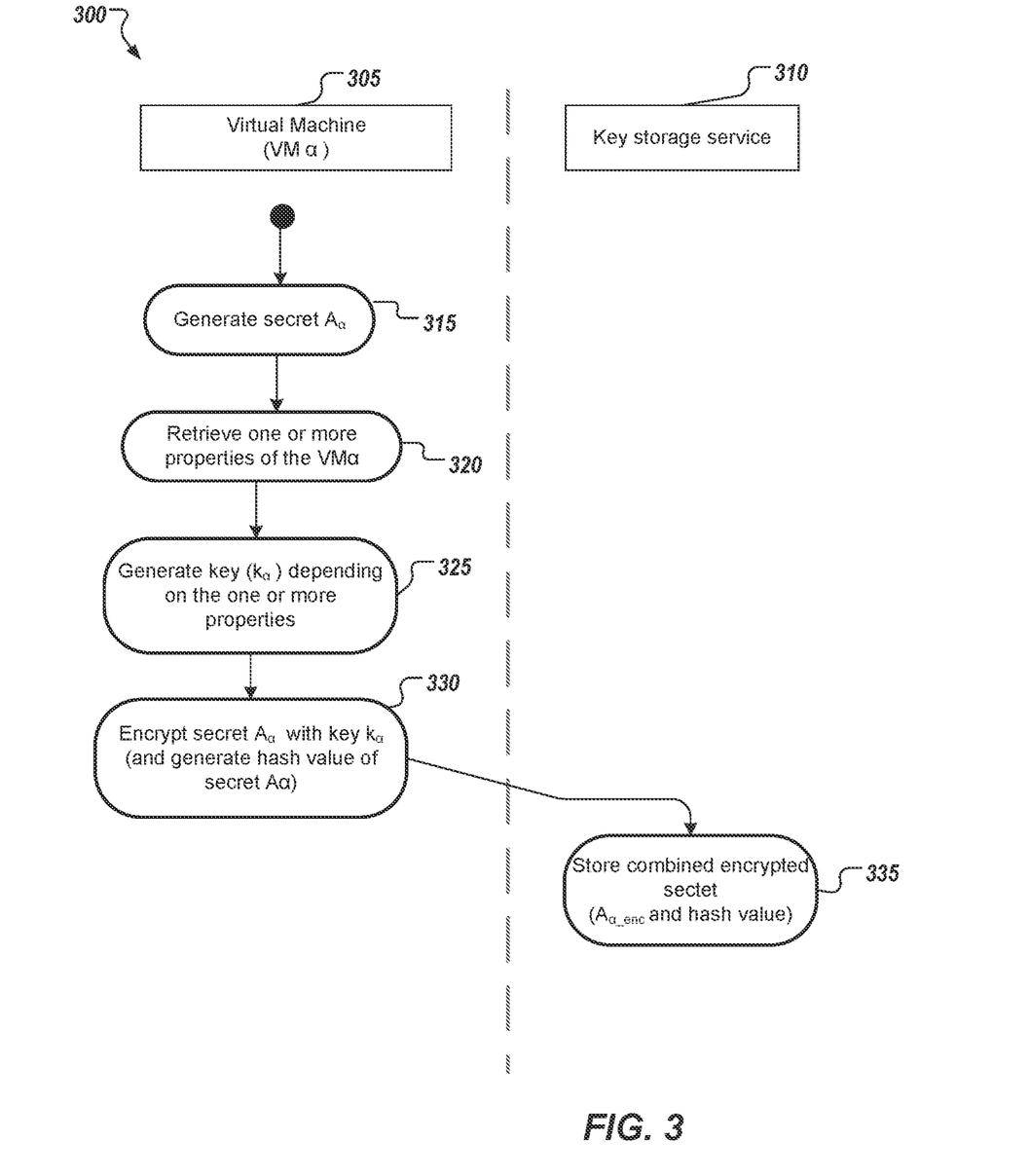
FIG. 3 depicts an example process for storing an encrypted secret of a virtual machine that can be executed in accordance with implementations of the present disclosure.

FIG. 3 depicts an example process 300 for storing an encrypted secret of a virtual machine that can be executed in accordance with implementations of the present disclosure. In some examples, the example process 300 is provided using one or more computer-executable programs executed by one or more computing devices. The process 300 is for storing an encrypted secret of confidential (secret) data used by one or more processes implemented at an application running on a virtual machine (VM(α)) 305 provided by a cloud environment. In some instances, the VM 305 can provide a virtual environment for running one or more applications (or application services) on the cloud environment, where different application can be provided from different cloud providers and can interact among each other in the context of execution of different composite processes. In some instances, execution of a process initiated at an application running on the VM 305 can be associated with performing actions related to secret data related to the application that can be acquired based on interaction of the application with one or more other cloud applications.

In some instances, at least one application running on the VM 305 can cache confidential data (e.g., secure privacy protected data) associated with executing processes at the application. In some instances, the VM 305 can be pre-prepared to support authentication mechanisms to determine origin of requests associated with cached data (including encrypted secret data) at the at least one application to provide access to cached data.

In some instances, when an application is provided and running on the VM a 305, and the application is caching data obtained from another application, for example, another cloud application, the application may restrict access to the cached data and apply an authorization regime. In those instances, access to cached data at the application can be restricted for process execution at the VM 305 based on authorization according to decrypting encrypted secret data at the cached data (e.g., a portion of the cached data that is protected). In some instances, cached data can be organized in segments to correspond to different authentication criteria and different access privileges.

In some instances, the virtual machine (VM a) 305 can be configured to generate and store a secret that can be decrypted during authorization of process execution at the VM 305. In some instances, the VM 305 can communicate with the key storage service 310 to store an encrypted secret to be used for authorization of process execution at the VM 305 and to restrict access to secret data. In some instances, if decryption of the encrypted secret is successful, the execution of the process can be authorized and access to the secret data in the cache can be provided.

At 315, the secret Aa is generated. In some other instances, the secret can be received as input from a separate generation process. The secret Aa can have different forms and formats and can be defined from different sources. For example, the secret can include confidential data obtained from human input, can be credential data, or other data obtained from another service or program.

At 320, one or more properties of the VM 305 are retrieved. In some case, the one or more properties may include a property that is a unique identifier of the VM 305, in other cases the one or more properties can include an image property of the VM 305, or identity credentials, among other example properties that cannot be cloned or changed during a cloning process of the VM 305. For example, if the VM 305 is cloned into a second VM, some properties of the first VM are not going to be cloned and replicated into the second VM. In that example, such properties that stay immutable for a virtual machine when started can be the one or more properties of the VM 305 that can be retrieved at 320. In some instances, the properties of the VM 305 that are retrieved are mutable when the VM 305 is cloned.

In some instances, the VM 305 can be part of a hyperscaler runtime environment that can scale appropriately as increased demand is added to the applications running on the cloud. In some instances, the one or more properties of the VM 305 that are retrieved at 320 can be provided by a hyperscaler application programming interface that is provided by the hyperscaler runtime environment.

At 325, a cryptographic key ($k_\alpha$) is determined based on the retrieved one or more properties of the VM 305. In this way, the cryptographic key ($k_\alpha$) is generated to correspond to the VM 305 and to be able to be used to uniquely identify the VM 305 from other virtual machines on the cloud environment.

At 330, an encrypted secret ($A_{\alpha\_enc}$) is generated by inputting the secret ($A_\alpha$) enc, and the cryptographic key ($k_\alpha$) into an encryption function. In some instances, a secure hash value can be created from the secret ($A_\alpha$) and combined with the encrypted secret to form a composite encrypted value. The secure hash value can be created based on a predefined hash function for use in verification whether a provided secret key corresponds to the secret ($A_\alpha$). In some implementations, the hash function is a cryptographic secure hash function such as a trapdoor function that is computationally easy to compute in one direction, and computationally expensive to compute in reverse way. The hash function can receive as input the secret ($A_\alpha$). In some instances, the hash function can receive as part of the input a salt value, where both the salt value and the secret can be used to generate the hash value. In some of those instances, the salt value can be provided for storing together with the hash value to be used during verification of the hash value. In some instances, the salt value can be stored together with the hash value generated based on the salt value and secret value, and thus the salt value and the hash value can be used for verification of the encrypted secret. In those cases, the secret ($A_\alpha$) may not be necessary stored and/or used for verification of the hash value.

At 335, the VM 305 stores the encrypted secret ($A_{\alpha\_enc}$) at the key storage service 310. In some instances, the encrypted secret can be stored together with the secure hash value to form a composite encrypted value that can be persisted at the key storage service 310. In some instances, the encrypted secret (or the composite encrypted value) can also be persisted at the VM 305.

In some instances, a process initiated at the VM 305 can be verified whether it is authorized to access cached data at the VM 305 that is confidential secret data in encrypted form. The verification can be based on determining whether decryption of the stored encrypted secret ($A_{\alpha\_enc}$) is persisted at the key storage service or retrieved from the cache data on the VM 305 with a key, where the key is determined based on properties of a virtual machine where the process is initiated. If the decryption is successful, the process can be authorized, and if the decryption fails, the process can be terminated.

Figure 4:
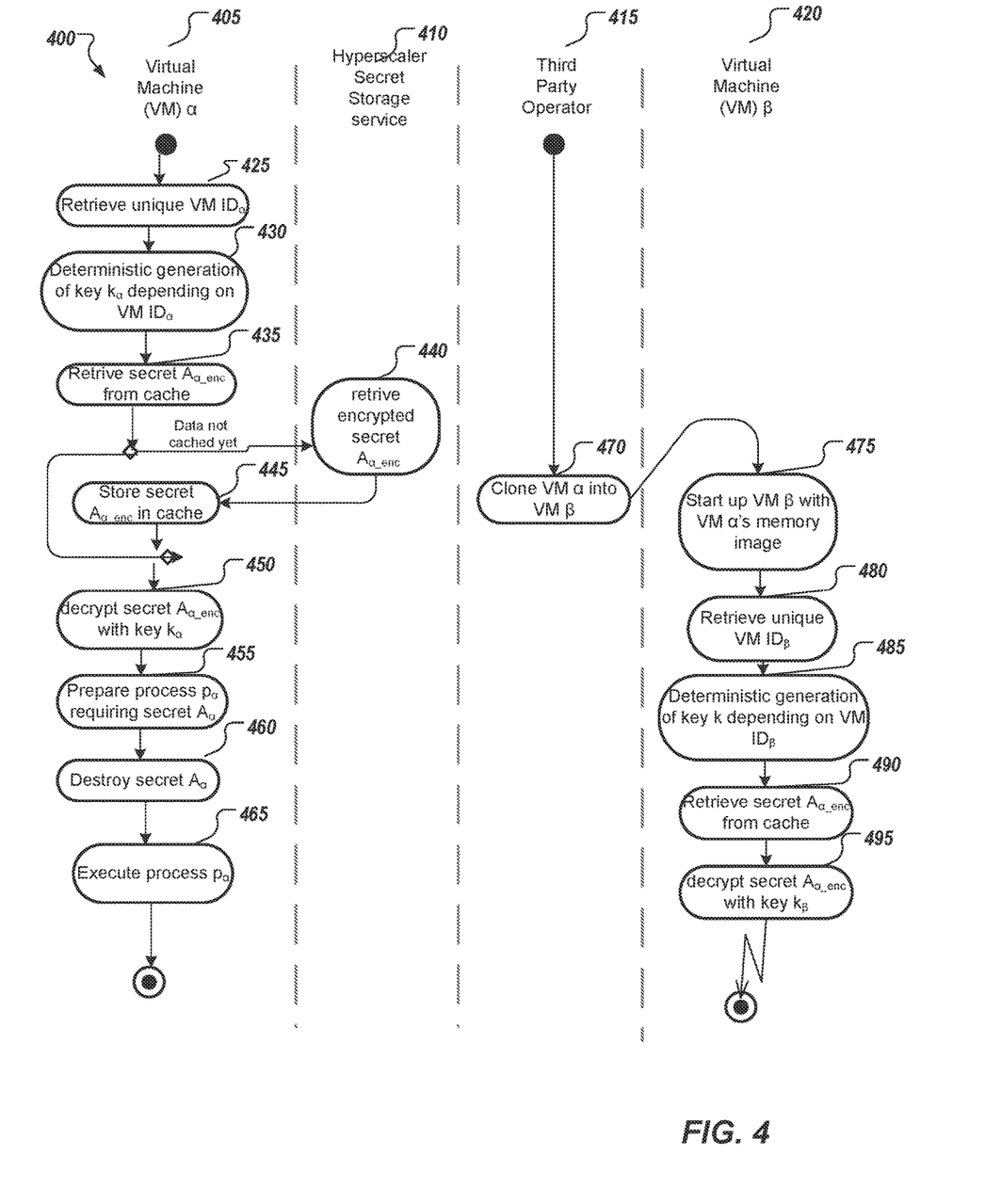
FIG. 4 depicts an example process for evaluating authorization for execution of a process on a virtual machine in a cloud environment that can be executed in accordance with implementations of the present disclosure.

FIG. 4 depicts an example process 400 for evaluating authorization for execution of a process on a virtual machine in a cloud environment that can be executed in accordance with implementations of the present disclosure.

In some instances, the process 400 is associated with a virtual machine ($VM_\alpha$) 405 that can be substantially similar to the VM 210 of FIG. 2 and VM 305 of FIG. 3, a hyperscaler secret storage service 410 that can be substantially similar to the key storage service 310 of FIG. 3, a third-party operator 415 that can be substantially similar to the third-party operator 225 of FIG. 2, and a virtual machine 420 that can be substantially similar to VM 215 of FIG. 2. The process 400 can be executed in a cloud environment providing virtualized runtime environments.

In some instances, the process 400 includes operations that are executed through applications running at virtual machines (VM 405 and 420) that are associated with authentication steps to determine rights to provide access to cached data in virtual machine environments. The cached data may be encrypted data that is privacy protected and require authentication to be accessed during process execution at a particular VM.

In some instances, if a process running within the virtual machine $VM_\alpha$ 405 is initiated and requires a secret Aa (e.g., confidential data) for further processing, at 425, a unique identifier of the VM can be retrieved from the $VM_\alpha$ 405. In some other instances, the unique identifier can be other property of the $VM_\alpha$ 405 that distinguishes $VM_\alpha$ 405 from other VMs in the cloud environment.

At 430, the VM $ID_\alpha$ can serve as an input parameter to a key generation function (e.g., deterministic cryptographic key derivation function) as described in FIG. 3 and associated with a preparational phase with a cryptographic key $k_\alpha$. The key generation can be similar to the generation as described at 325 of FIG. 3.

At 435, a composite encrypted value including an encrypted secret ($A_{\alpha\_enc}$) and enc, a hash value of a secret key ($A_\alpha$) is retrieved from a cache storage within the $VM_\alpha$ 405. In cases that the composite encrypted value is not stored in the cache, at 440, the composite encrypted secret can be retrieved (or read) from the hyperscaler secret storage service 410 and placed into the cache within the virtual machine $VM_\alpha$ 405. At 445, the retrieved composite encrypted secret can be stored at the $VM_\alpha$ 405.

At 450, the encrypted secret $A_{\alpha\_enc}$ enc part of the composite encrypted key is decrypted using the cryptographic key kα to determine a second secret $A_\alpha'$ in an attempt to use the decrypted secret for initiating the process on the $VM_\alpha$ 405. Additionally, a second hash value is generated of the second secret $A_\alpha'$ to be compared to the hash value obtained from the composite encrypted value.

The two hash values can be compared to determine whether they correspond and to be used as proof of identity of the requestor to use the data and to trust the authentication of the secret $A_\alpha$.

At 455, if the decryption at 450 is performed successfully, the determined secret matching the authentic secret Aα can be passed on to the initiated process pα at the $VM_\alpha$ 405. The process initiation requires such secret that is determined to be authentic for further processing of the execution of the initiated process. When a valid secret such as secret Aα is provided to the process, the process can be executed and the process can access cached data on the $VM_\alpha$ 405 that is defined as confidential data.

In some instances, at 460, before process pα actually starts to be executed, the memory location at the $VM_\alpha$ 405 that stores the secret Aα is to be erased securely. Such destroying of the secret may prevent a third-party operator, such as the third-party operator 415, to acquire the secret Aα by cloning virtual machine $VM_\alpha$ to provide virtual machine VM p.

In some instances, the $VM_\alpha$ 405 can be cloned by the third-party operator during execution of a process and the cloning can transfer the state of the $VM_\alpha$ 405 and its processes as they were at the time of the initiation of a cloning.

At 470, such a third-party operator could initiate to clone $VM_\alpha$ 405 into VMβ 420. The third-party operator can initiate, at 475, to start up the virtual machine $VM_\beta$ 420 by cloning the $VM_\alpha$ 405. The $VM_\beta$ 420 can include content of the random access memory of $VM_\alpha$ 405 including the cache that can include the persisted encrypted secret $A_{\alpha\_enc}$. A process running on the cloned $VM_\beta$ 420 can have access to some of the data at the memory of the VM but may have restricted access to confidential data (such as the encrypted secret $A_{\alpha\_enc}$) that requires authorization for access based on successful secret key decryption in accordance with implementations of the present disclosure.

At 480, the unique identifier ($ID_\beta$) of the $VM_\beta$ 420 is retrieved. In some instances, the $ID_\beta$ is returned by a hyperscaler application programming interface provided by a hyperscaler that managed the virtualization machine environment where the VMs 405 and 420 are hosted.

At 485, a cryptographic key $k_\beta$ is derived from $ID_\beta$ by utilizing the deterministic cryptographic key derivation function (e.g., as used at 430). After retrieving (490) the encrypted secret $A_{\alpha\_enc}$ enc from the cache of the $VM_\beta$ 420 (as it is cloned), at 495, the encrypted secret is decrypted using the $k_\beta$ to determine an encrypted secret $A_\alpha$, however, since the decryption key does not correspond to the original key used to encrypt the secret, the decryption fails. By calculating a second hash value of the determined encrypted secret $A_\alpha'$ and comparing this second hash value with the first hash value that is provided by the composite encrypted value $A_{\alpha\_enc}$ (retrieved at 490), a failure in the comparison can be determined. The failure is determined since the two hash values are different because the difference of the determined secret that does not match the secret as persisted for running processes requiring access to the cache data of the memory of this VM (the cloned $VM_\beta$ 420 and/or the $VM_\alpha$ 405). In those cases, the decryption of the secret with the determined key (485) fails and an exceptional termination of an initiated process is taking place. Due to the fact the origin of $A_{\alpha\_enc}$ does not match with $ID_\beta$ the third-party operator is unable to elevate privileges and thus, fails to acquire possession of secret $A_\alpha$.

Figure 5:
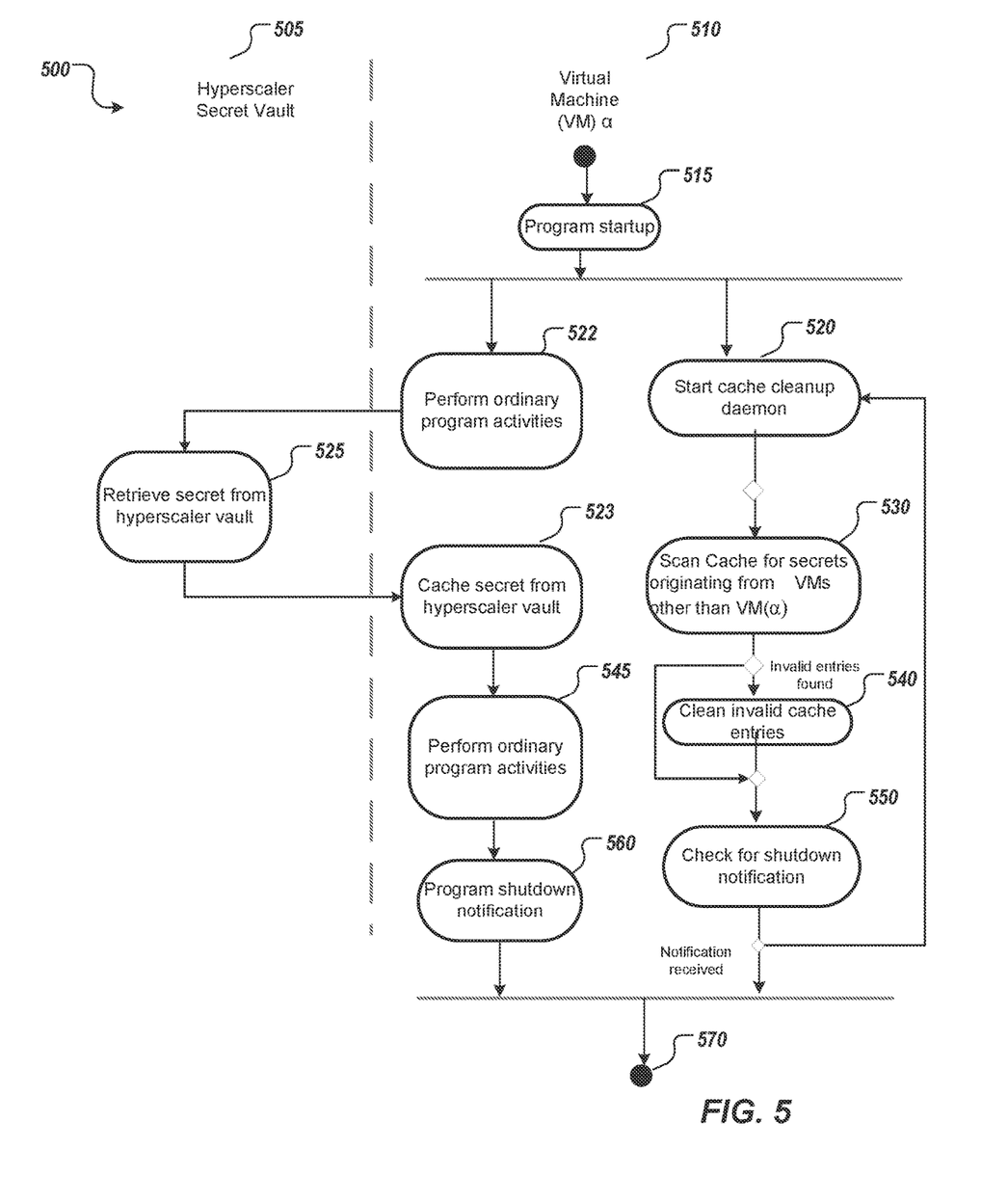
FIG. 5 depicts an example process for cache data cleanup on virtual machines configured to execute processes based on secret verification that can be executed in accordance with implementations of the present disclosure.

In some instances, a cache cleaning strategy can be performed in parallel (or substantially in parallel) to ordinary operations at a virtual machine such as the $VM_\alpha$ 405 and $VM_\beta$ 420 as described in FIG. 5. In parallel to the retrieval of a secret from the storage service and caching of the secret in encrypted form, a daemon can be activated at a VM where a process is initiated (e.g., the $VM_\alpha$ 405 of FIG. 4) to activate scanning of the cache of the VM for entries for which authentication for accessing data based on secret decryption can be associated with failure. Basically, for each cache entry at the VM, the daemon can use the retrieved unique VM ID (such as at 480 of FIG. 4) together with the cryptographic key (at 485) to perform a cache entry decryption to determine whether the cached data should be maintained or removed from the cache (as associated with confidential data that is restricted for access from that VM). Entries of secrets in the cache that lead to failure in decryption as discussed in relation to FIG. 4 can be removed from the cache.

FIG. 5 depicts an example process 500 for cache data cleanup on virtual machines configured to execute processes based on secret verification that can be executed in accordance with implementations of the present disclosure. In some instances, the hyperscaler secret vault 505 can be a secure secret storage service substantially similar to the hyperscaler secret storage service 410 of FIG. 4, and the $VM_\alpha$ 510 can be substantially similar to the VM 405 or 420 of FIG. 4.

At 515, a program is started on the $VM_\alpha$ 510, where the program (e.g., an application or service) execution includes performing ordinary activities 522 (e.g., implemented in the logic of the program). The performance of an ordinary activity may include an initiation of a process, for example as discussed at FIG. 2 and FIG. 4. At 525, a retrieval of a composite encrypted key from a hyperscaler secret vault 505 as a storage service associated with confidential data cached at the $VM_\alpha$ 510 is performed. At 523, the composite encrypted secret is cached and further ordinary activities are performed at 545, until the program receives a notification for shutdown at 560.

In parallel to the execution of ordinary program activities at the $VM_\alpha$ 510 where an encrypted secret key is retrieved and cached at the $VM_\alpha$ 510, a cleanup daemon is started (at 520) for cleaning the cache data at the $VM_\alpha$ 510.

At 530, the daemon performs scanning of the cache for secrets originating from VMs that can be different from the $VM_\alpha$ 510 itself. For example, the $VM_\alpha$ 510 can include secret data (e.g., in encrypted form) that is stored in the cache as a result of the VM being a cloned version of another VM where a process was running and confidential data was cached. If there are no secrets, then a notification is received and the cleanup is finished. If there are invalid entries (secret data that cannot be decrypted based on a key as described at 485, 490 and 495 of FIG. 4) found in the cache, at 540, the invalid entries are removed. If there are no invalid entries in the cache, at 550, a check for shutdown notification, such as the notification 560 is performed. If a notification for a shutdown is received after the check at 550, the program terminates at 570. Thus, through the cache cleanup daemon, secrets (e.g., composite encrypted values, encrypted secrets, secrets, keys) that are not associated with the current VM are deleted. For example, it can be determined whether they are associated with the VM based on one or more properties of the VM such as a unique ID of the VM as discussed above in relation to FIGS. 2, 3, and 4.

Figure 6:
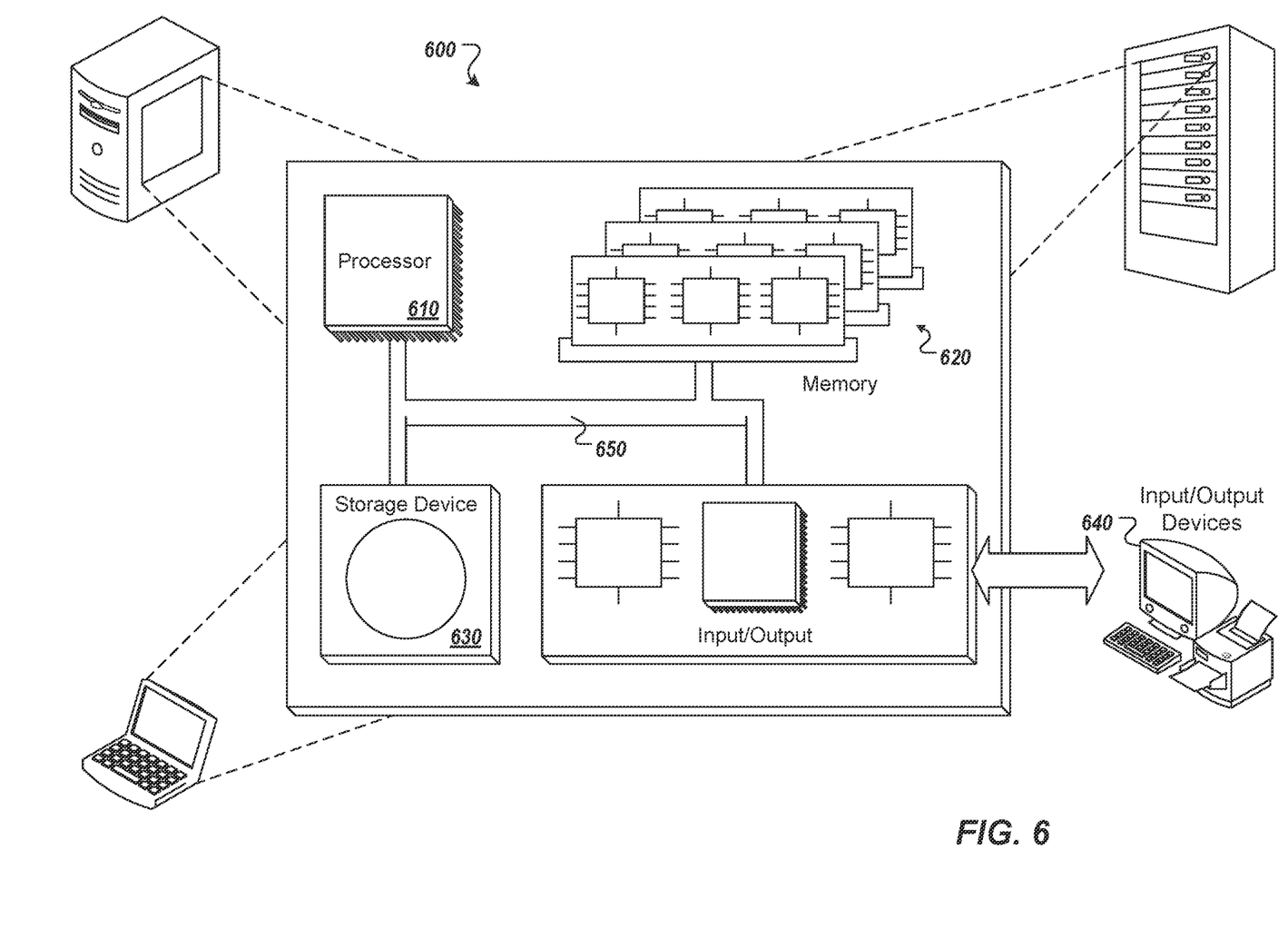
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, 640 are interconnected using a system bus 650. The processor 610 is capable of processing instructions for execution within the system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the system 600. In some implementations, the memory 620 is a computer-readable medium. In some implementations, the memory 620 is a volatile memory unit. In some implementations, the memory 620 is a non-volatile memory unit. The storage device 630 is capable of providing mass storage for the system 600. In some implementations, the storage device 630 is a computer-readable medium. In some implementations, the storage device 630 may be a floppy disk device, a hard disk device, an optical disk device, or a tape device. The input/output device 640 provides input/output operations for the system 600. In some implementations, the input/output device 640 includes a keyboard and/or pointing device. In some implementations, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

In view of the above described implementations of subject matter this application discloses the following list of examples, wherein one feature of an example in isolation or more than one feature of said example taken in combination and, optionally, in combination with one or more features of one or more further examples are further examples also falling within the disclosure of this application.

Example 1: A computer-implemented method comprising:
retrieving, at a first virtual machine, a first composite encrypted value comprising a first encrypted secret ($A_{\alpha\_enc}$) and a first secure hash value of a first secret ($A_\alpha$);
decrypting the first encrypted secret ($A_{\alpha\_enc}$) using a cryptographic key ($k_\alpha$) to determine a second secret ($A_\alpha'$) to be used for initiating a first process ($p_\alpha$) on the first virtual machine, wherein the cryptographic key ($k_\alpha$) is determined based on a set of properties of the first virtual machine that are mutatable during cloning of the first virtual machine;
generating a second secure hash value of the second secret ($A_\alpha'$);
comparing the second secure hash value with the first secure hash value to determine whether to authorize execution of the first process on the first virtual machine using the first secret ($A_\alpha$); and
in response to determining that the second secure hash value and the first secure hash value match, initiating the first process ($p_\alpha$) at the first virtual machine by providing the first secret ($A_\alpha$) for processing through the first process ($p_\alpha$).

Example 2. The method of Example 1, further comprising:
retrieving, at the first virtual machine, the set of properties of the first virtual machine, wherein a property from the set of properties is a unique identifier for the first virtual machine from a plurality of virtual machines that provide virtual environment resources for running applications and services.

Example 3. The method of Example 1 or 2, wherein the composite encrypted value is retrieved from a cache storage of the first virtual machine or from a secret storage associated with the first virtual machine.

Example 4. The method of any one of the preceding Examples, further comprising:
generating the first encrypted secret ($A_{\alpha\_enc}$), to be stored at a security storage associated with the first virtual machine, wherein the first secret ($A_\alpha$) is generated based on source data from at least one of secure random number generator, human input, and an external service program.

Example 5. The method of any one of the preceding Examples, wherein the first process ($p\alpha$) is implemented at an application running on the first virtual machine and managed by a hyperscaler, wherein the hyperscaler provides a runtime environment comprising virtual resources for hosting virtual machines.

Example 6. The method of any one of the preceding Examples, wherein the retrieval of the first composite encrypted value is performed upon start of the first virtual machine, wherein a secure space for storing secure cache data is identified by an operating system running at the first virtual machine, wherein the first process ($p\alpha$) is authorized to access the secure space upon successful decryption of the first encrypted secret ($A\alpha\_enc$) and verification of the first secure hash value when the first secure hash value matched with the second secure hash value.

Example 7. The method of any one of the preceding Examples, wherein the first composite encrypted value is associated with a first service provider and is stored by a secret storage service of a second service provider, wherein the first service provider and the second service provider manage application deployed on a cloud platform, the cloud platform including the first virtual machine and other virtual machines.

Example 8. The method of any one of the preceding Examples, wherein the first virtual machine provides a first virtual environment including virtual resources for running the first process ($p\alpha$), and wherein the first process ($p\alpha$) when running consume services provided by a second virtual environment, wherein the first virtual environment and the second virtual environment are different trust zones of a cloud platform.

Example 9. The method of Example 8, wherein the second virtual environment hosts a storage service for storing the first composite encrypted value.

What is claimed is:

1. A computer-implemented method comprising:
retrieving, at a first virtual machine, a first composite encrypted value comprising a first encrypted secret ($A_{\alpha\_enc}$) and a first secure hash value of a first secret ($A_\alpha$);
decrypting the first encrypted secret ($A_{\alpha\_enc}$) using a cryptographic key ($k_\alpha$) to determine a second secret ($A_\alpha'$) to be used for initiating a first process ($p_\alpha$) on the first virtual machine, wherein the cryptographic key ($k_\alpha$) is determined based on a set of properties of the first virtual machine that are mutatable during cloning of the first virtual machine;
generating a second secure hash value of the second secret ($A_\alpha'$);
comparing the second secure hash value with the first secure hash value to determine whether to authorize execution of the first process on the first virtual machine using the first secret ($A_\alpha$); and
in response to determining that the second secure hash value and the first secure hash value match, initiating the first process ($p_\alpha$) at the first virtual machine by providing the first secret ($A_\alpha$) for processing through the first process ($p_\alpha$).

2. The method of claim 1, further comprising:
retrieving, at the first virtual machine, the set of properties of the first virtual machine, wherein a property from the set of properties is a unique identifier for the first virtual machine from a plurality of virtual machines that provide virtual environment resources for running applications and services.

3. The method of claim 1, wherein the composite encrypted value is retrieved from a cache storage of the first virtual machine or from a secret storage associated with the first virtual machine.

4. The method of claim 1, further comprising:
generating the first encrypted secret ($A_{\alpha\_enc}$), to be stored at a security storage associated with the first virtual machine, wherein the first secret ($A_\alpha$) is generated based on source data from at least one of secure random number generator, human input, and an external service program.

5. The method of claim 1, wherein the first process ($p_\alpha$) is implemented at an application running on the first virtual machine and managed by a hyperscaler, wherein the hyperscaler provides a runtime environment comprising virtual resources for hosting virtual machines.

6. The method of claim 1, wherein the retrieval of the first composite encrypted value is performed upon start of the first virtual machine, wherein a secure space for storing secure cache data is identified by an operating system running at the first virtual machine, wherein the first process ($p_\alpha$) is authorized to access the secure space upon successful decryption of the first encrypted secret ($A_{\alpha\_enc}$) and verification of the first secure hash value when the first secure hash value matched with the second secure hash value.

7. The method of claim 1, wherein the first composite encrypted value is associated with a first service provider and is stored by a secret storage service of a second service provider, wherein the first service provider and the second service provider manage application deployed on a cloud platform, the cloud platform including the first virtual machine and other virtual machines.

8. The method of claim 1, wherein the first virtual machine provides a first virtual environment including virtual resources for running the first process ($p_\alpha$), and wherein the first process ($p_\alpha$) when running consume services provided by a second virtual environment, wherein the first virtual environment and the second virtual environment are different trust zones of a cloud platform.

9. The method of claim 8, wherein the second virtual environment hosts a storage service for storing the first composite encrypted value.

10. A non-transitory computer-readable storage medium coupled to one or more processors and having instructions stored thereon which, when executed by the one or more processors, cause the one or more processors to perform operations comprising:
retrieving, at a first virtual machine, a first composite encrypted value comprising a first encrypted secret ($A_{\alpha\_enc}$) and a first secure hash value of a first secret ($A_\alpha$);
decrypting the first encrypted secret ($A_{\alpha\_enc}$) using a cryptographic key ($k_\alpha$) to determine a second secret ($A_\alpha'$) to be used for initiating a first process ($p_\alpha$) on the first virtual machine, wherein the cryptographic key ($k_\alpha$) is determined based on a set of properties of the first virtual machine that are mutatable during cloning of the first virtual machine;
generating a second secure hash value of the second secret ($A_\alpha'$);
comparing the second secure hash value with the first secure hash value to determine whether to authorize execution of the first process on the first virtual machine using the first secret ($A_\alpha$); and
in response to determining that the second secure hash value and the first secure hash value match, initiating the first process ($p_\alpha$) at the first virtual machine by providing the first secret ($A_\alpha$) for processing through the first process ($p_\alpha$).

11. The computer-readable storage medium of claim 10, further comprising instructions, which when executed by the one or more processors, cause the one or more processors to perform operations comprising:
retrieving, at the first virtual machine, the set of properties of the first virtual machine, wherein a property from the set of properties is a unique identifier for the first virtual machine from a plurality of virtual machines that provide virtual environment resources for running applications and services.

12. The computer-readable storage medium of claim 10, wherein the composite encrypted value is retrieved from a cache storage of the first virtual machine or from a secret storage associated with the first virtual machine.

13. The computer-readable storage medium of claim 10, further comprising instructions, which when executed by the one or more processors, cause the one or more processors to perform operations comprising:
generating the first encrypted secret ($A_{\alpha\_enc}$), to be stored at a security storage associated with the first virtual machine, wherein the first secret ($A_\alpha$) is generated based on source data from at least one of secure random number generator, human input, and an external service program.

14. The computer-readable storage medium of claim 10, wherein the first process ($p_\alpha$) is implemented at an application running on the first virtual machine and managed by a hyperscaler, wherein the hyperscaler provides a runtime environment comprising virtual resources for hosting virtual machines.

15. The computer-readable storage medium of claim 10, wherein the retrieval of the first composite encrypted value is performed upon start of the first virtual machine, wherein a secure space for storing secure cache data is identified by an operating system running at the first virtual machine, wherein the first process ($p_\alpha$) is authorized to access the secure space upon successful decryption of the first encrypted secret ($A_{\alpha\_enc}$) and verification of the first secure hash value when the first secure hash value matched with the second secure hash value.

16. A system, comprising:
a computing device; and
a computer-readable storage device coupled to the computing device and having instructions stored thereon which, when executed by the computing device, cause the computing device to perform operations comprising:
retrieving, at a first virtual machine, a first composite encrypted value comprising a first encrypted secret ($A_{\alpha\_enc}$) and a first secure hash value of a first secret ($A_\alpha$);
decrypting the first encrypted secret ($A_{\alpha\_enc}$) using a cryptographic key ($k_\alpha$) to determine a second secret ($A_\alpha'$) to be used for initiating a first process ($p_\alpha$) on the first virtual machine, wherein the cryptographic key ($k_\alpha$) is determined based on a set of properties of the first virtual machine that are mutatable during cloning of the first virtual machine;
generating a second secure hash value of the second secret ($A_\alpha'$);
comparing the second secure hash value with the first secure hash value to determine whether to authorize execution of the first process on the first virtual machine using the first secret ($A_\alpha$); and
in response to determining that the second secure hash value and the first secure hash value match, initiating the first process ($p_\alpha$) at the first virtual machine by providing the first secret ($A_\alpha$) for processing through the first process ($p_\alpha$).

17. The system of claim 16, wherein the computer-readable storage device further comprises instructions, which when executed by the computing device, cause the computing to perform operations comprising:
retrieving, at the first virtual machine, the set of properties of the first virtual machine, wherein a property from the set of properties is a unique identifier for the first virtual machine from a plurality of virtual machines that provide virtual environment resources for running applications and services.

18. The system of claim 16, wherein the composite encrypted value is retrieved from a cache storage of the first virtual machine or from a secret storage associated with the first virtual machine.

19. The system of claim 16, wherein the computer-readable storage device further comprises instructions, which when executed by the computing device, cause the computing to perform operations comprising:
generating the first encrypted secret ($A_{\alpha\_enc}$), to be stored at a security storage associated with the first virtual machine, wherein the first secret ($A_\alpha$) is generated based on source data from at least one of secure random number generator, human input, and an external service program.

20. The system of claim 16, wherein the first process ($p_\alpha$) is implemented at an application running on the first virtual machine and managed by a hyperscaler, wherein the hyperscaler provides a runtime environment comprising virtual resources for hosting virtual machines.

* * * * *